(12) United States Patent
Wang et al.

(10) Patent No.: US 11,709,348 B2
(45) Date of Patent: Jul. 25, 2023

(54) LENS MODULE AND CAMERA

(71) Applicant: OMNIVISION OPTOELECTRONICS TECHNOLOGIES (SHANGHAI) CO., LTD., Shanghai (CN)

(72) Inventors: Hui Wang, Shanghai (CN); Aigang Qiu, Shanghai (CN); Shaozhi Li, Shanghai (CN)

(73) Assignee: OMINIVISION OPTOELECTRONICS TECHNOLOGIES (SHANGHAI) CO., LTD., Shanghai (CN)

( * ) Notice: Subject to any disclaimer, the term of this patent is extended or adjusted under 35 U.S.C. 154(b) by 149 days.

(21) Appl. No.: 16/984,639

(22) Filed: Aug. 4, 2020

(65) Prior Publication Data
US 2021/0199931 A1   Jul. 1, 2021

(30) Foreign Application Priority Data
Dec. 27, 2019   (CN) .......................... 201911380254.X (51) Int. Cl.
*G02B 13/00* (2006.01)
*G02B 7/02* (2021.01)
*H04N 23/55* (2023.01)

(52) U.S. Cl.
CPC ......... *G02B 13/0085* (2013.01); *G02B 7/021* (2013.01); *G02B 7/025* (2013.01); *H04N 23/55* (2023.01)

(58) Field of Classification Search
CPC .... G02B 13/0085; G02B 7/021; G02B 7/025; H04N 5/2254; H04N 23/55; G03B 17/12
See application file for complete search history.

(56) References Cited

U.S. PATENT DOCUMENTS

| | | | |
|---|---|---|---|
| 2005/0077458 A1* | 4/2005 | Ma | H01L 24/05 257/E31.128 |
| 2006/0192230 A1* | 8/2006 | Wood | H01L 27/14618 257/234 |

(Continued)

FOREIGN PATENT DOCUMENTS

| | | |
|---|---|---|
| CN | 1873455 A | 12/2006 |
| CN | 102298185 A | 12/2011 |

(Continued)

OTHER PUBLICATIONS

Office Action received for Taiwanese Patent Application No. 109131519, dated May 11, 2021, 6 pages (1 page of English Translation of Search Report and 5 pages of Office Action).

*Primary Examiner* — Abdelaaziz Tissire
(74) *Attorney, Agent, or Firm* — Womble Bond Dickinson (US) LLP (57) ABSTRACT

A lens module arranged on a light-sensing surface of a sensor module is disclosed. The lens module includes at least one lens stacked along an optical axis and the lens includes a lens fixing element and a plurality of lens elements. The lens fixing element is provided with a plurality of through holes each receiving a corresponding one of the lens elements, and an edge of the lens elements is secured to the lens fixing element. According to the present invention, each of the through holes has the same shape as a corresponding one of photosensitive regions of the light-sensing surface, as well as a side wall spaced from the photosensitive region in the direction perpendicular to the optical axis by a relatively uniform gap. In the present invention, there is also provided a camera comprising such a lens module.

14 Claims, 5 Drawing Sheets

(56) References Cited

U.S. PATENT DOCUMENTS

| | | | | |
|---|---|---|---|---|
| 2008/0073734 | A1* | 3/2008 | Kong | H01L 27/14618 257/E31.127 |
| 2008/0087974 | A1* | 4/2008 | Kwon | H01L 27/14685 257/E31.127 |
| 2009/0067830 | A1* | 3/2009 | Tamaki | G02B 27/0018 396/308 |
| 2009/0079863 | A1* | 3/2009 | Aoki | H04N 5/2257 348/E5.026 |
| 2009/0109542 | A1 | 4/2009 | Li et al. | |
| 2010/0025710 | A1* | 2/2010 | Yamada | H01L 27/14618 257/E33.056 |
| 2010/0073781 | A1* | 3/2010 | Tsai | B29D 11/00365 264/2.7 |
| 2012/0229916 | A1* | 9/2012 | Yano | G02B 27/0018 359/707 |
| 2012/0242814 | A1* | 9/2012 | Kubala | H04N 5/2254 83/13 |
| 2013/0271858 | A1* | 10/2013 | Koh | G02B 7/021 359/819 |
| 2015/0333094 | A1* | 11/2015 | Wan | B32B 38/0004 359/811 |
| 2018/0196170 | A1* | 7/2018 | Tazawa | B29D 11/00307 |
| 2018/0284394 | A1 | 10/2018 | Chen et al. | |

FOREIGN PATENT DOCUMENTS

| | | |
|---|---|---|
| CN | 203311076 U | 11/2013 |
| CN | 203350513 U | 12/2013 |
| CN | 206696574 U | 12/2017 |
| CN | 207799205 U | 8/2018 |
| CN | 108627936 A | 10/2018 |
| JP | 2012-114728 A | 6/2012 |
| TW | 201123870 A | 7/2011 |
| TW | 201348785 A | 12/2013 |

\* cited by examiner

LENS MODULE AND CAMERA

CROSS-REFERENCE TO RELATED APPLICATION

This application claims the priority of Chinese patent application number 201911380254.X, filed on Dec. 27, 2019, the entire contents of which are incorporated herein by reference.

TECHNICAL FIELD

The present invention relates to the field of optical lenses and, in particular, to a lens module and a camera.

BACKGROUND

The rapid development of imaging technology has led to wide use of lens modules in various applications such as digital cameras, smart phones, as well as face recognition that is fast growing recently. Lens modules features dimensional compactness and powerful functionality, and working principle of the lens modules is: to convert an optical image of a scene captured by a lens into electrical signals by projecting the image onto the surface of an image sensor. A lens employed in such a lens module is composed of lens elements and important to the lens module because it plays a vital role in imaging quality. Specifically, the lens mainly determines image clarity (sharpness, lighting and depth of field) and a dynamic range, and has an impact on the highest possible number of pixels.

Traditional lens modules were bulky and could barely be used in applications with strict size requirements. Modern lens modules employing wafer-level optical lenses fabricated by wafer-level optics (WLO) processes have greatly reduced footprints. Differing from the traditional optic manufacturing techniques, a WLO process involves fabricating identical lens dies throughout individual wafers using semiconductor processes, bonding these lens wafers together, and dicing the bonded structure into individual lens modules. Therefore, WLO processes are more suitable for the fabrication of mobile consumer electronics, especially in the case of complex 3D vision emitters. Wafer-level optical lenses are advantageous in an effectively reduce footprint, good consistency, light weight, low profile, high beam quality and suitability for low-cost mass production using semiconductor processes.

However, the ever-developing technology is now imposing even higher requirements on the size of lens modules, and further shrinkage of existing lens modules is a problem that is necessary to be solved.

SUMMARY OF THE INVENTION

It is an object of the present invention to provide a lens module and a camera, with a reduced size enabled by reasonable space utilization.

The above object is attained by a lens module provided in the present invention, which is arranged on a light-sensing surface of a sensor module. The lens module comprises at least one lens stacked along an optical axis, wherein the lens comprises a lens fixing element and a plurality of lens elements, wherein: the lens fixing element is provided with a plurality of through holes; each of the plurality of lens elements is located inside a corresponding one of the plurality of through holes; and an edge of the lens element is secured through the lens fixing element.

The light-sensing surface comprises a plurality of photosensitive regions, and each of the plurality of through holes has a shape same as a shape of a corresponding one of the plurality of photosensitive regions of the light-sensing surface.

Optionally, the through hole may have a trapezoidal cross-section along the optical axis; or the through hole may have a cross-section along the optical axis that gradually tapers from a center to each side.

Optionally, the through hole may have a polygonal shape and each corner of the polygonal shape is a rounded corner, and wherein the rounded corner has a central angle of from 50° to 120°.

Optionally, each of the through hole and the corresponding one of the photosensitive regions is a square.

Optionally, the edge of the lens element may be bonded to the lens fixing element by an adhesive layer.

Optionally, the lens fixing elements of adjacent lenses may be boned together by an adhesive layer.

Optionally, each of the plurality of through holes may have a size greater than a size of a corresponding one of the photosensitive regions.

Optionally, the lens element may be a wafer-level optical lens.

Optionally, the lens fixing element may be made of glass, photoresist or plastic.

The above object is also attained by a camera comprising a sensor module and a lens module arranged on a light-sensing surface of the sensor module. The lens module comprises at least one lens stacked along an optical axis, wherein the lens comprises a lens fixing element and a plurality of lens elements, wherein: the lens fixing element is provided with a plurality of through holes; each of the plurality of lens elements is located inside a corresponding one of the plurality of through holes; and an edge of the lens element is secured though the lens fixing element.

The light-sensing surface comprises a plurality of photosensitive regions, and each of the plurality of through holes has a shape same as a shape of a corresponding one of the plurality of photosensitive regions of the light-sensing surface.

Optionally, the through hole may have a trapezoidal cross-section along the optical axis; or the through hole may have a cross-section along the optical axis that gradually tapers from a center to each side.

Optionally, the through hole may have a polygonal shape and each corner of the polygonal shape is a rounded corner, and wherein the rounded corner has a central angle of from 50° to 120°.

Optionally, each of the through hole and the corresponding one of the photosensitive regions is a square.

Optionally, the edge of the lens element may be bonded to the lens fixing element by an adhesive layer.

Optionally, the lens fixing elements of adjacent lenses may be boned together by an adhesive layer.

Optionally, each of the plurality of through holes may have a size greater than a size of a corresponding one of the photosensitive regions.

Optionally, the lens element may be a wafer-level optical lens.

Optionally, the lens fixing element may be made of glass, photoresist or plastic.

In the present invention, there is provided a lens module arranged on a light-sensing surface of a sensor module. The lens module comprises at least one lens stacked along an optical axis, wherein the lens comprises a lens fixing element and a plurality of lens elements, wherein: the lens fixing element is provided with a plurality of through holes; each of the plurality of lens elements is located inside a corresponding one of the plurality of through holes; and an edge of the lens element is secured though the lens fixing element. According to the present invention, each of the through holes has the same shape as a corresponding one of photosensitive regions of the light-sensing surface, as well as a side wall spaced from the photosensitive region in the direction perpendicular to the optical axis by a relatively uniform gap. This will not lead to a significant waste of space and is conducive to miniaturization of the lens module. In the present invention, there is also provided a camera comprising such a lens module. With the same size of the lens module, this design allows a greater size of the lens element and of the photosensitive region, resulting in a higher resolution of the lens module.

BRIEF DESCRIPTION OF THE DRAWINGS

FIG. 1b is a schematic cross-sectional view of the lens module taken along line A-A' in FIG. 1a.

FIG. 2b is a schematic cross-sectional view of the lens module taken along line B-B' in FIG. 2a.

In these figures,

100: a lens; 110: a lens element; 120: a lens fixing element; 121: a through hole; 130: an adhesive layer; 200: a sensor module; 210: a photosensitive region;

300: a lens; 310: a lens element; 320: a lens fixing element; 321: a through hole; 330: an adhesive layer; 400: a sensor module; 410: a photosensitive region; and Z: an optical axis.

DETAILED DESCRIPTION

Figure 1A:
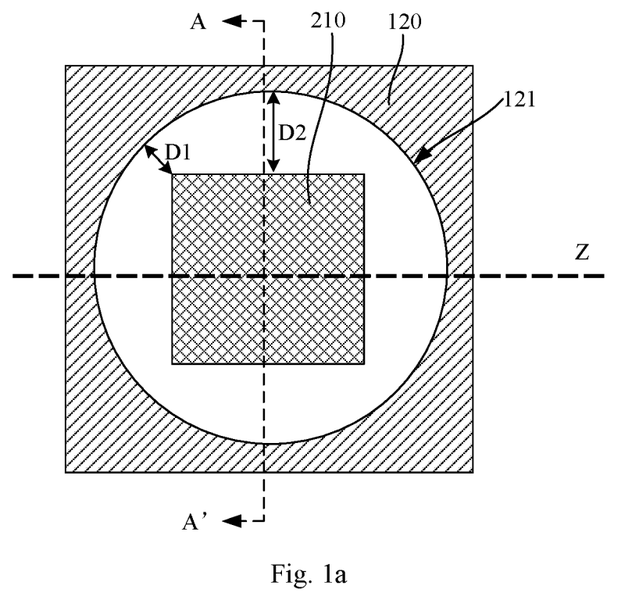
FIG. 1a is a structural schematic of a lens module fabricated by a WLO process.
Figure 1B:
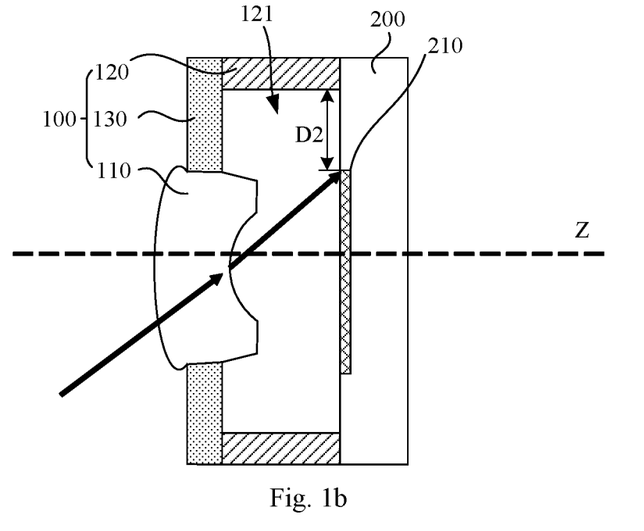

FIGS. 1a and 1b schematically illustrate a lens module fabricated by a WLO process. As shown in FIGS. 1a and 1b, the lens module is arranged on a light-sensing surface of a sensor module 200 and includes at least one lens 100 stacked along an optical axis Z. The lens 100 includes a lens fixing element 120 and lens elements 110. The lens fixing element 120 is provided with a plurality of through holes 121, and each of the lens elements 110 is received in a corresponding one of the through holes 121, with its edge secured to the lens fixing element 120 by an adhesive layer 130. The lens element 110 usually has a circular shape (optical lenses has a circular shape), and the through hole 121 of the lens fixing element 120 is also made circular. However, a photosensitive region 210 of the light-sensing surface of the sensor module 200 is often square, and a diameter of the lens element 110 is generally designed to be smaller than a diameter of the through hole 121 in order to avoid any blind angle of imaging. Further, in order to secure the lens element 110 to the lens fixing element 120, glue is applied to the lens fixing element 120 (edge of the through hole 121), which forms the adhesive layer 130 after cured, and then the lens element 110 is secured to the lens fixing element 120 by using the adhesive layer 130. Since the diameter of the lens element 110 is smaller than that of the through hole 121, it is also necessary for the adhesive layer 130 to fill the gap between the through hole 121 and the lens element 110 in the direction perpendicular to the optical axis Z.

During the application process, bleeding of the glue from the lens fixing element 120 toward the photosensitive region 210 along the through hole 121 is inevitable. For this reason, it is necessary to make the through hole 121 greater in size than the photosensitive region 210, in order to avoid the adhesive from spreading onto the photosensitive region 210. In other words, the through hole 121 must encompass the photosensitive region 210, with a gap left between an edge of the photosensitive region 210 and the inner wall of the through hole 121 in the direction perpendicular to the optical axis Z, which is sufficient to accommodate the bleeding glue. As shown in FIG. 1, since the through hole 121 is circular while the photosensitive region 210 is square, a minimum gap width D1 between the edge of the photosensitive region 210 and the inner wall of the through hole 121 in the direction perpendicular to the optical axis Z is defined by the distance of each corner of the photosensitive region 210 from the inner wall of the through hole 121 in the direction perpendicular to the optical axis Z, while a maximum gap width D2 between the edge of the photosensitive region 210 and the inner wall of the through hole 121 in the direction perpendicular to the optical axis Z is defined by the distance of each side of the photosensitive region 210 from the inner wall of the through hole 121 in the direction perpendicular to the optical axis Z. When the minimum gap width D1 between the edge of the photosensitive region 210 and the inner wall of the through hole 121 in the direction perpendicular to the optical axis Z is sufficient to accommodate the bleeding adhesive (i.e., the adhesive will not spread throughout D1), the maximum gap width D2 between the edge of the photosensitive region 210 and the inner wall of the through hole 121 in the direction perpendicular to the optical axis Z will be excessively large and lead to a waste of the internal space of the lens 100, which is unfavorable to the miniaturization of the lens module.

In view of this, in this present invention, there is provided a lens module arranged on a light-sensing surface of a sensor module. The lens module includes at least one lens stacked along an optical axis, wherein the lens includes a lens fixing element and a plurality of lens elements. The lens fixing element is provided with a plurality of through holes, and each of the lens elements is located inside a corresponding one of the through holes, and an edge thereof is secured through the lens fixing element. According to the present invention, each through hole has the same shape as a photosensitive region of the light-sensing surface, and a side wall spaced from the photosensitive portion in the direction perpendicular to optical axis by a relatively uniform gap. This will not lead to a significant waste of space and is conducive to miniaturization of the lens module. Further, with the same size of the lens module, this design allows a greater size of lens element and of the photosensitive region, resulting in a higher resolution of the lens module. In this invention, there is also provided a camera comprising such a lens module.

The present invention will be described in greater detail by ways of specific examples with reference to the accompanying drawings. Features and advantages of the invention will be more apparent from the following detailed description. Note that the figures are provided in a very simplified form not necessarily presented to scale, with their only intention to facilitate convenience and clarity in explaining the disclosed examples.

Embodiment 1

Figure 2A:
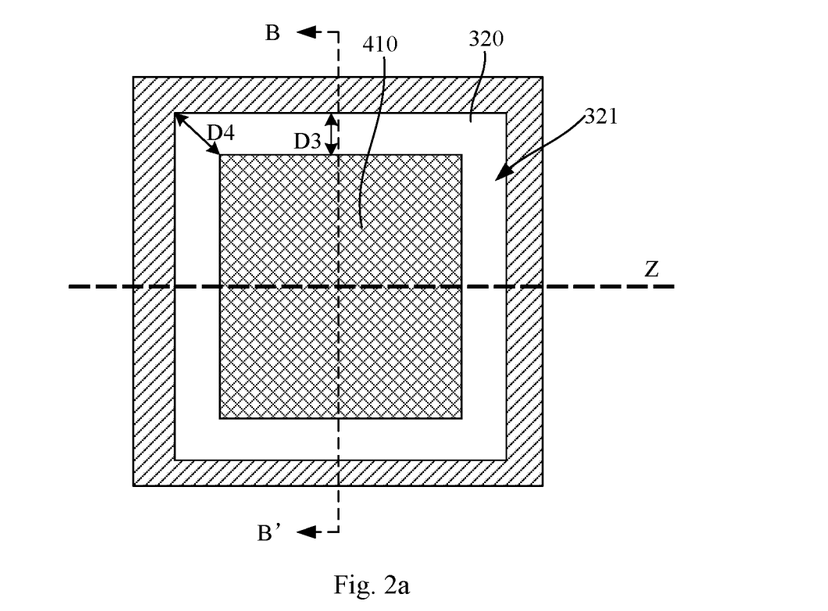
FIG. 2a is a structural schematic of a lens module according to a first embodiment of the present invention.
Figure 2B:
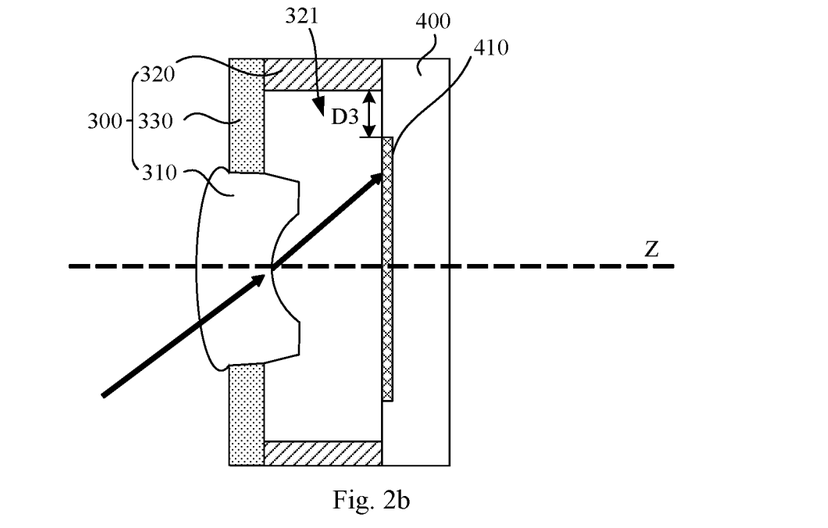

FIGS. 2a and 2b are schematic views of a lens module according to an embodiment of the present invention. As shown in FIGS. 2a and 2b, the lens module is arranged on a light-sensing surface of a sensor module 400, wherein the lens module comprises at least one lens 300 stacked along an optical axis Z, wherein the lens 300 comprises a lens fixing element 320 and a plurality of lens elements 310. The lens fixing element 320 is provided with a plurality of through holes 321. Each of the plurality of lens elements 310 is located inside a corresponding one of the plurality of through holes 321; and an edge of the lens element is secured through the lens fixing element 320. Each of the plurality of through holes 321 has a shape same as a corresponding one of the photosensitive regions 410 of the light-sensing surface.

Specifically, according to the present invention, the lens module may include only one lens 300. The lens 300 includes the lens fixing element 320 and one lens element 310. Accordingly, the light-sensing surface of the sensor module 400 has one photosensitive region 410. The lens fixing element 320 is provided with one through hole 321, and the size of the lens elements 310 is smaller than the size of the through hole 321 so as to avoid any blind angle when imaging. Further, in order to secure the lens element 310 to the lens fixing element 320, glue is applied to the lens fixing element 320 (an inner wall of the through hole 321), which forms the adhesive layer 330 after cured. Then the lens element 310 is secured to the lens fixing element 320 by using the adhesive layer 330. Since a diameter of the lens element 310 is smaller than that of the through hole 321, it is also necessary for the adhesive layer 330 to fill the gap between the through hole 321 and the lens element 310 in the direction perpendicular to the optical axis Z.

According to the present invention, each of the through hole 321 and the photosensitive region 410 is square, and the through hole 321 is greater in size than the photosensitive region 410, so that a gap is left between an outer edge of the photosensitive region 410 and the inner wall of the through hole 321. In this design, a minimum gap width D3 between the edge of the photosensitive region 410 and the inner wall of the through hole 321 in the direction perpendicular to the optical axis Z is defined by the distance of each side of the photosensitive region 410 from a corresponding side of the inner wall of the through hole 321 in the direction perpendicular to the optical axis Z, while a maximum gap width D4 between each corner of the photosensitive region 410 and a corresponding inner wall of the through hole 321 in the direction perpendicular to the optical axis Z is defined by the distance of each corner of the photosensitive region 410 from a corresponding corner of the inner wall of the through hole 321 in the direction perpendicular to the optical axis Z.

When the minimum gap width D3 between the edge of the photosensitive region 410 and the inner wall of the through hole 321 in the direction perpendicular to the optical axis Z is sufficient to accommodate bleeding adhesive (i.e., the size of D3 is sufficient for bleeding adhesive), the maximum gap width D4 between the corner of the photosensitive region 410 and the inner wall of the through hole 321 in the direction perpendicular to the optical axis Z will be sufficient for bleeding adhesive as well. The difference between D4 and D3 in the direction perpendicular to the optical axis Z in the lens module according to this embodiment is much smaller than the difference between D2 and D1 in the direction perpendicular to the optical axis Z in the lens module of FIG. 1. Therefore, the lens module of this embodiment is allowed to have a reduced size.

Figure 3:
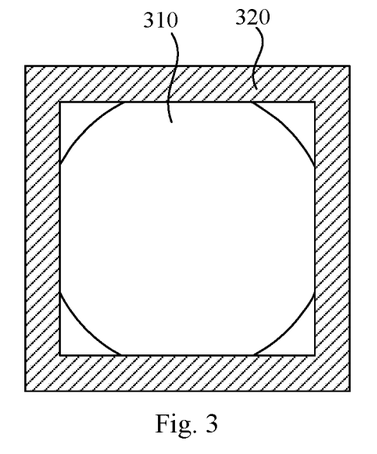
FIG. 3 is a schematic diagram illustrating a lens element that is greater in size than a through hole according to the first embodiment of the present invention.

In addition, with the same size of the lens module, the lens element 310 and the photosensitive region 410 are allowed to expand in size, resulting in an increased resolution of the lens module. In this case, as shown in FIG. 3, since the sizes of the lens element 310 and the photosensitive region 410 are increased, the size of the lens element 310 may be greater than the size of the through hole 321 so that an edge of the lens element 310 is partially outside the through hole 321. This can avoid an edge portion of the lens element 310 from adversely affecting imaging performance of the sensor module 400.

Figure 4A:
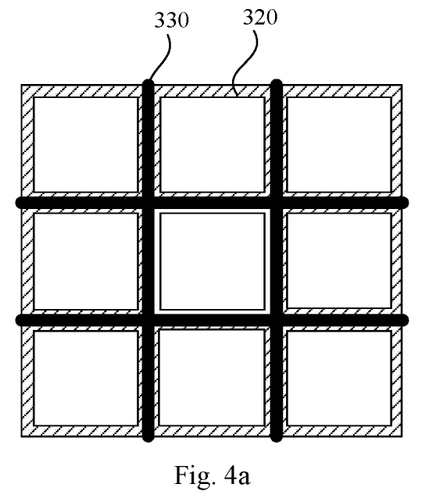
FIGS. 4a to 4c schematically illustrate three adhesive layer examples formed by different adhesive application methods according to the first embodiment of the present invention.
Figure 4B:
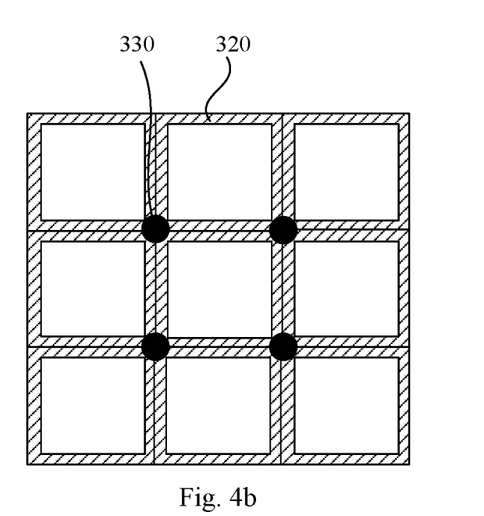
Figure 4C:
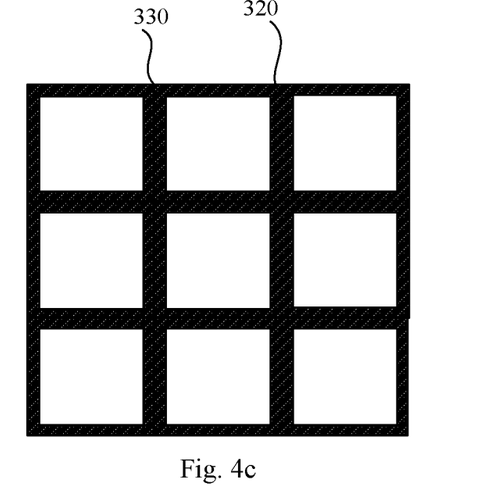

Additionally, with the same sizes of the lens module, the lens element 310 and the photosensitive region 410, this embodiment enables a more uniform gap between the edge of the photosensitive region 410 and the inner wall of the through hole 321 in the direction perpendicular to the optical axis Z and a greater minimum gap width D3 between the edge of the photosensitive region 410 and the inner wall of the through hole 321 in the direction perpendicular to the optical axis Z, which can accommodate more bleeding adhesive and thus improve production yield of the lens module. As shown in FIGS. 4a to 4c, since a greater gap for accommodating bleeding adhesive is allowed in accordance with this embodiment, with the same sizes of the lens module, the lens element 310 and the photosensitive region 410, more process flexibility can be achieved in the formation of the adhesive layer 330 by applying the adhesive to the lens fixing element 320. For example, the adhesive may be linearly applied in steps so that the adhesive layer 330 consists of crossed strips, as shown in FIG. 4a. Alternatively, the adhesive may be discretely dispensed so that the adhesive layer 330 consists of discrete dots, as shown in FIG. 4b. Still alternatively, the adhesive may be roller-coated so that the resulting adhesive layer 330 is a planar structure.

Optionally, the lens module may include a plurality of such lenses 300 as described above, e.g., two, three, four or more. In such a case, the lenses 300 are stacked one over another along the optical axis Z with their centers aligned with one another and configured to guide incident light onto the light-sensing surface of the sensor module 400. Further, the lens fixing elements 320 of adjacent lenses 300 may be bonded together by an adhesive layer 330.

Optionally, the lens 300 may include a plurality of lens elements 310, e.g., two, three, four or more. In such a case, the lens fixing element 320 may be provided with the same plurality of through holes 321 as the lens elements 310 so that each of the lens elements 310 is received in a corresponding one of the through holes 321. Additionally, the light-sensing surface of the sensor module 400 may have the same plurality of photosensitive regions 410 as the lens elements 310 so that light incident on the lens 300 can be guided onto the corresponding photosensitive regions 410 for imaging.

Optionally, the through hole 321 and the photosensitive region 410 may assume another polygonal shape, such as pentagonal, hexagonal or heptagonal. In such a case, each corner of the polygon has a rounded corner, and the rounded corner has a central angle of from 50° to 120° so that the through hole 321 may be formed more easily with reduced process complexity.

Further, the lens elements 310 may be wafer-level optics (WLO). This can result in additional shrinkage of the lens module.

It is to be understood that the lens fixing element 320 may be formed of glass, photoresist or plastic. Additionally, it may be either light-transmitting or not, and the present invention is not limited in this regard.

On the basis of the above, as shown in FIGS. 2*a* and 2*b*, there is also provided a camera in this embodiment. The camera includes a sensor module 400 and a lens module as defined above. The lens module is arranged on a light-sensing surface of the sensor module 400, wherein the lens module comprises at least one lens 300 stacked along an optical axis Z, wherein the lens includes a lens fixing element 320 and a plurality of lens elements 310. The lens fixing element 320 is provided with a plurality of through hole 321, each of the plurality of lens elements 310 is located inside a corresponding one of the plurality of through holes 321 and an edge of the lens element is secured though the lens fixing element 320. Each of the plurality of through holes 321 has a shape same as a corresponding one of photosensitive regions 410 of the light-sensing surface.

Further, the sensor module 400 may be a CCD or CMOS sensor, and the present invention is not limited to any particular type of the sensor module 400.

Embodiment 2

Figure 5:
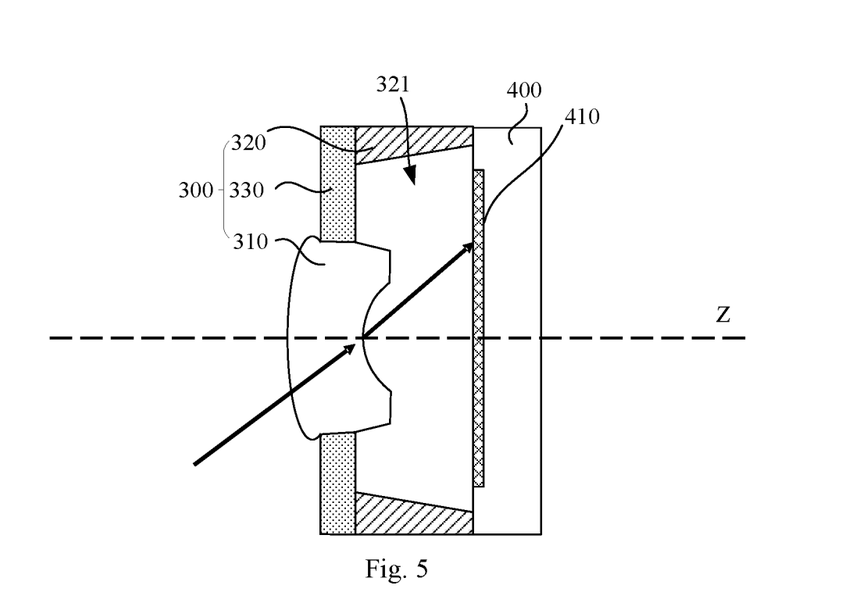
FIG. 5 is a structural schematic of a lens module according to a second embodiment of the present invention.
Figure 6:
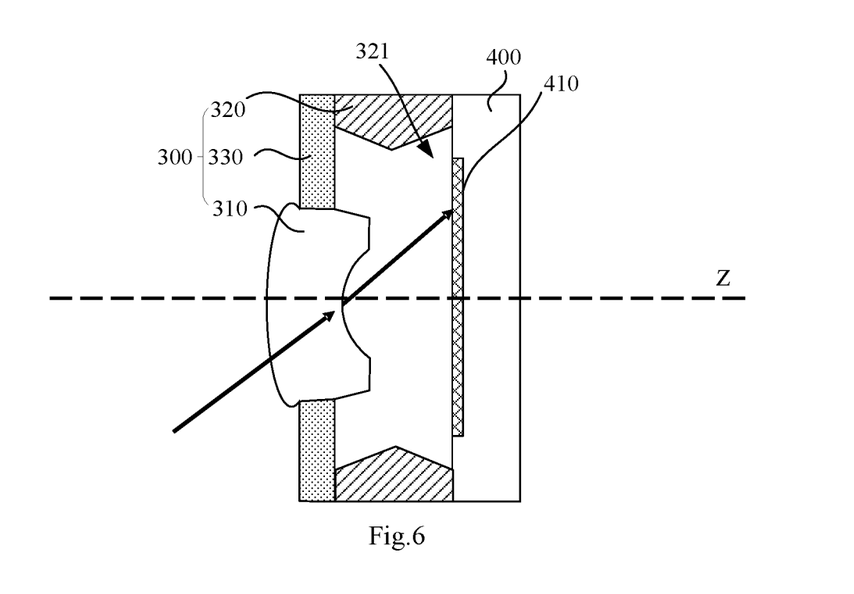
FIG. 6 is a structural schematic of another lens module according to the second embodiment of the present invention.

FIGS. 5 and 6 are structural schematics of lens modules according to embodiments of the present invention. As shown in FIGS. 5 and 6, differing from the Embodiment 1, the through hole 321 has a trapezoidal cross-section along the direction of the optical axis Z, and a size of the through hole 321 close to the sensor module is greater than a size of the through hole 321 away from the sensor module 400, or the through hole 32 has a cross-section along the optical axis Z that gradually tapers from a center to each side, in accordance with these embodiments. As such, in practice, when a light beam incident on the lens element 310 is introduced into the through hole 321, it will be reflected on the side wall of the through hole 321 at different angles, resulting in a desired imaging effect. For example, a blurred image can be captured with the lens module of FIG. 5.

It is to be understood that the cross-section of the through hole 321 along the direction of the optical axis Z may also assume a different shape (as needed by a desired imaging effect), and a further detailed thereof will be omitted herein.

In summary, in embodiments of the present invention, there is provided a lens module arranged on a light-sensing surface of a sensor module. The lens module includes at least one lens stacked along an optical axis and the lens includes a lens fixing element and a plurality of lens elements. The lens fixing element is provided with a plurality of through hole. Each of the plurality of lens elements is located inside a corresponding one of the plurality of through holes and an edge of the lens element is secured through the lens fixing element. According to the present invention, each of the plurality of through holes has the same shape as a corresponding one of the photosensitive regions of the light-sensing surface, as well as a side wall of the through hole spaced from the photosensitive region in the direction perpendicular to the optical axis by a relatively uniform gap. This will not lead to a significant waste of space and is conducive to miniaturization of the lens module. In the present invention, there is also provided a camera comprising such a lens module. With the same size of the lens module, this design allows a greater size of the lens element and of the photosensitive region, resulting in a higher resolution of the lens module.

Presented above are merely some preferred embodiments of the present invention, which do not limit the invention in any way. Changes in any forms made to the principles and teachings disclosed herein, including equivalents and modifications, by any person of ordinary skill in the art without departing from the scope of the invention are intended to fall within the scope of the invention.

What is claimed is:

1. A lens module arranged on a light-sensing surface of a sensor module, wherein the lens module comprises at least one lens stacked along an optical axis, wherein the lens comprises a lens fixing element, a plurality of lens elements and an adhesive layer which is in contact with an edge of each of the plurality of lens elements and is configured to bond the lens element to the lens fixing element, wherein:
the lens fixing element has a plurality of walls delimiting a plurality of through holes; each of the plurality of lens elements is located inside a corresponding one of the plurality of through holes,
wherein the light-sensing surface comprises a plurality of photosensitive regions, and each of the plurality of through holes has a shape same as a shape of a corresponding one of the plurality of photosensitive regions of the light-sensing surface,
wherein each of the through holes is delimited by four corresponding walls of the lens fixing element and has a square-shaped cross-section, each wall consists of two inclined faces that adjoin each other and form a protrusion pointing to a middle portion of the through hole, and
wherein the through hole delimited by the four corresponding walls has a cross-section dimension gradually decreasing from a bottom to the middle portion of the through hole and gradually increasing from the middle portion to a top of the through hole.

2. The lens module of claim 1, wherein the through hole has a polygonal shape and each corner of the polygonal shape is a rounded corner, and wherein the rounded corner has a central angle of from 50° to 120°.

3. The lens module of claim 1, wherein each of the through hole and the corresponding one of the photosensitive regions is a square.

4. The lens module of claim 1, wherein the lens fixing elements of adjacent lenses are boned together by an adhesive layer.

5. The lens module of claim 1, wherein each of the plurality of through holes has a size greater than a size of a corresponding one of the photosensitive regions.

6. The lens module of claim 1, wherein the lens element is a wafer-level optical lens.

7. The lens module of claim 1, wherein the lens fixing element is made of glass, photoresist or plastic.

8. A camera comprising a sensor module and a lens module arranged on a light-sensing surface of the sensor module, wherein the lens module comprises at least one lens stacked along an optical axis, wherein the lens comprises a lens fixing element, a plurality of lens elements and an adhesive layer which is in contact with an edge of the plurality of lens elements and is configured to bond the lens element to the lens fixing element, wherein:

the lens fixing element has a plurality of walls delimiting a plurality of through holes; each of the plurality of lens elements is located inside a corresponding one of the plurality of through holes, wherein the light-sensing surface comprises a plurality of photosensitive regions, and each of the plurality of through holes has a shape same as a shape of a corresponding one of the plurality of photosensitive regions of the light-sensing surface, wherein each of the through holes is delimited by four corresponding walls of the lens fixing element and has a square-shaped cross-section, each wall consists of two inclined faces that adjoin each other and form a protrusion pointing to a middle portion of the through hole, and wherein the through hole delimited by the four corresponding walls has a cross-sectional dimension gradually decreasing from a bottom to the middle portion of the through hole and gradually increasing from the middle portion to a top of the through hole.

9. The camera of claim 8, wherein the through hole has a polygonal shape and each corner of the polygonal shape is a rounded corner, and wherein the rounded corner has a central angle of from 50° to 120°.

10. The camera of claim 8, wherein each of the through hole and the corresponding one of the photosensitive regions is a square.

11. The camera of claim 8, wherein the lens fixing elements of adjacent lenses are boned together by an adhesive layer.

12. The camera of claim 8, wherein each of the plurality of through holes has a size greater than a size of a corresponding one of the photosensitive regions.

13. The camera of claim 8, wherein the lens element is a wafer-level optical lens.

14. The camera of claim 8, wherein the lens fixing element is made of glass, photoresist or plastic.

* * * * *